Jan. 7, 1930.　　　　J. H. WEST　　　　1,742,567
INDICATOR
Filed Dec. 11, 1928

Inventor
James H. West

By Hardway Cathey
Attorneys

Patented Jan. 7, 1930

1,742,567

UNITED STATES PATENT OFFICE

JAMES H. WEST, OF HOUSTON, TEXAS

INDICATOR

Application filed December 11, 1928. Serial No. 325,286.

This invention relates to new and useful improvements in an indicator.

One object of the invention is to provide a device of the character described whereby a record may be made and temporarily kept, and quickly changed as desired.

Another object of the invention is to provide a small compact mechanism that may be readily attached to the dash board, or other conveniently located part of a motor vehicle and whereby a record may be kept which will indicate the mileage at which the vehicle will require service such as oiling, greasing, or the like.

With the above and other objects in view this invention has particular relation to certain novel features of construction, operation and arrangement of parts an example of which is given in this specification and illustrated in the accompanying drawings, wherein:—

Figure 1:
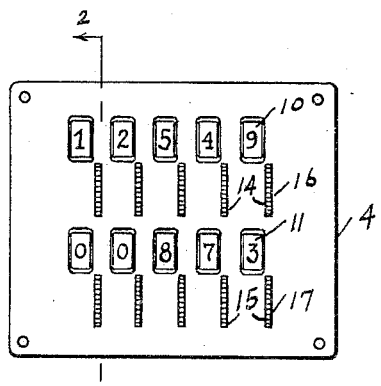
Figure 1 shows a front elevation of the device.
Figure 2:
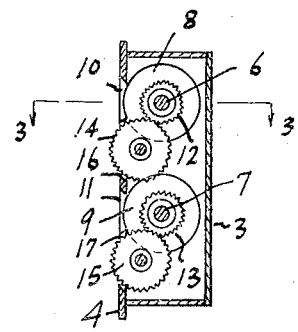
Figure 2 shows a vertical sectional view thereof taken on the line 2—2 of Figure 1.
Figure 3:
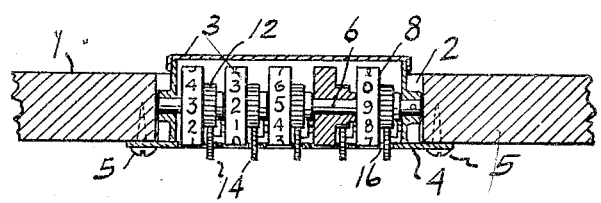
Figure 3 shows a sectional view taken on the line 3—3 of Figure 2.

Referring now more particularly to the drawings, wherein like numerals of reference designate similar parts in each of the figures, the numeral 1 designates the dash board of a motor vehicle, or other suitable support, having a cut-away portion forming an opening 2 into which the casing 3 may be inserted. The front plate 4 of the casing extends out forming a flange which fits against the board 1 and is secured thereto by the screws 5.

In the casing there are the upper and lower transverse rods 6, 7 on which the upper and lower series of data discs 8, 9 are rotatably mounted. The face or margin of each disc has the numerals from 0 to 9 thereon and in front of each upper and lower disc there are the openings, or windows, 10, 11.

Each disc has a reduced extended hub, said hubs having external gear teeth and being designated by the numerals 12, 13.

Actuating discs 14, 15 are rotatably mounted in the casing and are provided with external gear teeth in mesh with the respective gears 12, 13. The outer margins of the discs 14, 15 work through slots 16, 17 in the front-plate 4. By turning an actuating disc the corresponding data disc may be also turned.

The upper series of discs may be used to indicate the mileage at which the vehicle should be greased. When the speedometer indicates the same mileage as this series of discs the vehicle is then greased and said data discs are then turned so that they will indicate, in advance, the mileage which must be attained before it will be necessary to again grease the vehicle. Similarly the lower series of discs may be used to indicate the mileage at which the vehicle should be supplied with a lubricant, and when supplied said discs may be adjusted, in an abvious manner to make a record of the mileage at which the vehicle should again be oiled.

While I have shown what I now consider the preferred form of the invention it is obvious that mechanical changes may be made therein and equivalents substituted for the parts shown and I reserve the right to make such mechanical changes and substitutions as may be comprehended within the principle of the invention.

What I claim is:—

A device of the character described including a casing having a series of openings and a corresponding series of slots, a series of data carrying discs rotatably mounted in the casing and aligned behind the respective openings, actuating discs rotatably mounted in the casing and working through the repective slots and operative connections between each actuating disc and its corresponding data disc, said operative connections comprising a reduced externally geared hub carried by each data disc and marginal teeth carried by each actuating disc in mesh with the corresponding hub.

In testimony whereof I have signed my name to this specification.

JAMES H. WEST.